(12) United States Patent
Kim

(10) Patent No.: US 10,482,140 B2
(45) Date of Patent: Nov. 19, 2019

(54) METHOD AND SYSTEM FOR PROVIDING RETARGETING SEARCH SERVICE

(71) Applicant: NAVER Corporation, Seongnam-si (KR)

(72) Inventor: Woongsub Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 396 days.

(21) Appl. No.: 14/991,076

(22) Filed: Jan. 8, 2016

(65) Prior Publication Data

US 2016/0203227 A1    Jul. 14, 2016

(30) Foreign Application Priority Data

Jan. 8, 2015    (KR) .................. 10-2015-0002559

(51) Int. Cl.
  *G06F 16/9535*    (2019.01)
  *G06F 16/248*    (2019.01)

(52) U.S. Cl.
  CPC ........ *G06F 16/9535* (2019.01); *G06F 16/248* (2019.01)

(58) Field of Classification Search
  CPC ............... G06Q 30/02; G06Q 30/0269; G06Q 30/0255; G06Q 30/0246; G06Q 30/0201; G06F 17/30867; G06F 17/30554; G06F 17/30598; G06F 17/30864; G06F 16/9535; G06F 16/248; H04L 63/10; G11C 8/18
  USPC ........................................................ 707/722
  See application file for complete search history.

(56) References Cited

U.S. PATENT DOCUMENTS

| | | | |
|---|---|---|---|
| 9,298,786 B1 * | 3/2016 | Wang | G06F 17/30867 |
| 9,367,847 B2 * | 6/2016 | Priyadarshan | G06Q 30/00 |
| 2002/0052762 A1 * | 5/2002 | Kobylevsky | G06Q 30/06 705/2 |
| 2003/0195884 A1 * | 10/2003 | Boyd | G06F 17/30867 |
| 2008/0294523 A1 * | 11/2008 | Little | G06Q 30/02 705/14.53 |
| 2010/0005001 A1 * | 1/2010 | Aizen | G06Q 30/02 705/14.73 |
| 2010/0161378 A1 * | 6/2010 | Josifovski | G06Q 30/0243 705/14.42 |

(Continued)

FOREIGN PATENT DOCUMENTS

| | | |
|---|---|---|
| CN | 103856530 A | 6/2014 |
| CN | 104166700 A | 11/2014 |

(Continued)

OTHER PUBLICATIONS

Google, Winning the Second Chance, Google, May 2010, all pages (Year: 2010).*

(Continued)

*Primary Examiner* — Jay A Morrison
*Assistant Examiner* — Antonio J Caiado
(74) *Attorney, Agent, or Firm* — Greer, Burns & Crain, Ltd.

(57) ABSTRACT

A method of providing a retargeting search service includes storing a log about query information input from a user during a preset period of time, and providing a retargeting keyword and a retargeting search result to at least one of a user mobile terminal and a user computer terminal according to an information providing point in time based on the stored log.

17 Claims, 8 Drawing Sheets

(56) References Cited

U.S. PATENT DOCUMENTS

| | | | | |
|---|---|---|---|---|
| 2011/0282739 A1* | 11/2011 | Mashinsky | ............ | G06Q 30/02 705/14.53 |
| 2011/0295997 A1* | 12/2011 | Priyadarshan | ......... | G06Q 30/00 709/224 |
| 2012/0124025 A1* | 5/2012 | Saglam | ............ | G06F 17/30867 707/707 |
| 2012/0136855 A1* | 5/2012 | Ni | ..................... | G06F 17/30867 707/724 |
| 2012/0143859 A1* | 6/2012 | Lymperopoulos | .......................... G06F 17/3087 | 707/724 |
| 2012/0330752 A1* | 12/2012 | Kim | ....................... | G06Q 30/02 705/14.54 |
| 2013/0006764 A1* | 1/2013 | Zhang | ................ | G06Q 30/0254 705/14.52 |
| 2013/0254190 A1* | 9/2013 | Nakano | ............ | G06F 17/30554 707/727 |
| 2013/0346396 A1* | 12/2013 | Stamm | ............. | G06F 17/30867 707/722 |
| 2014/0032306 A1* | 1/2014 | Sukornyk | ............. | G06Q 30/02 705/14.43 |
| 2014/0074822 A1* | 3/2014 | Lee | .................. | G06F 17/30554 707/722 |
| 2014/0208216 A1* | 7/2014 | Koo | ..................... | G06F 3/0484 715/736 |
| 2014/0214540 A1* | 7/2014 | Lee | .................... | G06Q 30/0256 705/14.54 |
| 2015/0046516 A1* | 2/2015 | Tsuchida | ................ | H04L 67/42 709/203 |
| 2015/0379571 A1* | 12/2015 | Grbovic | .......... | G06Q 30/0256 705/14.54 |
| 2016/0117727 A1* | 4/2016 | Campbell | .......... | G06Q 30/0256 705/14.54 |
| 2018/0232371 A1* | 8/2018 | Lee | .................. | G06F 17/30038 |

FOREIGN PATENT DOCUMENTS

| | | | | |
|---|---|---|---|---|
| KR | 10-0764473 B1 * | 10/2007 | ............. | H04W 4/00 |
| KR | 10-1090771 B1 * | 12/2011 | ............... | H04W 4/00 |
| KR | 10-1624382 B1 * | 5/2016 | ............. | G06F 17/30 |

OTHER PUBLICATIONS

"Google, MS account, Apple ID, etc., Net is connected in behind", Nikkei PC, Nikkei BP Corp., May 12, 2014, No. 697, p. 24-27.

Japanese Office Action dated Nov. 1, 2016 by the Japanese Patent Office corresponding to Japanese patent application No. 2016-000856.

Chinese Office Action dated Jul. 18, 2018 by the Chinese Patent Office corresponding to Chinese patent application No. 201511017983.0.

* cited by examiner

METHOD AND SYSTEM FOR PROVIDING RETARGETING SEARCH SERVICE

CROSS-REFERENCE TO RELATED APPLICATION(S)

This application claims priority under 35 U.S.C. § 119 to Korean Patent Application No. 10-2015-0002559, filed Jan. 8, 2015, in the Korean Intellectual Property Office (KIPO), the entire contents of which are incorporated herein by reference.

BACKGROUND

Field

One or more example embodiments of the present invention relate to search service technology, and more particularly, to a method and system for providing a retargeting search service.

Description of Related Art

This section provides background information related to the present disclosure which is not necessarily prior art.

In general, a user conducts a search using a query through a search service or obtains a result from information provided from a provider through browsing experience, in order to retrieve desired information. However, since a query search through the search service has a relatively low relation to each individual user, a relatively large amount of time is used to acquire a result desired by the user.

Further, with the use of a personal computer (PCs) or a mobile communication terminal being generalized, a user may post a question through a social networking service (SNS) and may receive answers to the question from other users. Also, a real-time question search through the SNS enables communication over the answers provided from the other users. Accordingly, the user may obtain information having a relatively high relation to the user immediately.

SUMMARY

This section provides a general summary of the disclosure, and is not a comprehensive disclosure of its full scope or all of its features.

One or more example embodiments provide a retargeting search service providing system that provides a method of providing a retargeting keyword to a user mobile terminal or a user computer terminal according to an information providing point in time based on a stored log.

One or more example embodiments also provide a retargeting search service providing system that provides a method of enabling interaction between a log about data retrieved from a user mobile terminal and a log about data retrieved from a user computer terminal.

According to at least one example embodiment, there is provided a method of providing a retargeting search service, the method including storing a log about query information input from a user during a preset period of time, and providing a retargeting keyword and a retargeting search result to at least one of a user mobile terminal and a user computer terminal according to an information providing point in time based on the stored log.

Storing of the log may include generating a first log about query information input from the user mobile terminal and a second log about query information input from the user computer terminal, and transmitting the first log generated from the user mobile terminal to the user computer terminal, and transmitting the second log generated from the user computer terminal to the user mobile terminal.

Storing of the log may include enabling interaction between the user mobile terminal and the user computer terminal based on log-in information or unidentifiable personal information about the user that uses a search service.

Providing of the retargeting keyword and the retargeting search result may include determining a terminal to which the retargeting keyword and the retargeting search result are to be provided, based on the information providing point in time.

Providing of the retargeting keyword and the retargeting search result may include providing a function of providing the retargeting keyword and the retargeting search result to the user mobile terminal after a first time preset as weekdays, based on information about a query input from the user computer terminal during the preset first time, or a function of providing the retargeting keyword and the retargeting search result to the user computer terminal after a second time preset as the weekdays based on information about a query input from the user mobile terminal during the preset second time.

Providing of the retargeting keyword and the retargeting search result may include providing the retargeting keyword and the retargeting search result to the user mobile terminal during weekends, a day off, and a public holiday, based on query information input from the user computer terminal and the user mobile terminal during the weekdays.

Providing of the retargeting keyword and the retargeting search result may include providing a different user interface of outputting the retargeting keyword and the retargeting search result to each of the user mobile terminal and the user computer terminal.

Providing of the retargeting keyword and the retargeting search result may include outputting a search result page that includes the retargeting keyword and a search result about a query input from the user using the user mobile terminal, and inform that the retargeting keyword is updated on the search result page.

Providing of the retargeting keyword and the retargeting search result may include outputting an information providing page that includes the retargeting search result to be displayed on the search result page in a layer form, in response to a selection of the user on the retargeting keyword.

Providing of the retargeting keyword and the retargeting search result may include providing a first frame for outputting a search result about a query input from the user using the user computer terminal and a second frame for outputting the retargeting keyword and the retargeting search result, and simultaneously outputting a result to be output on the first frame and a result to be output on the second frame.

Providing of the retargeting keyword and the retargeting search result may include outputting at least one keyword retrieved by the user in response to the user unfolding a search box, and marking an updated keyword in response to updating information about the output at least one keyword.

According to at least one example embodiment, there is provided a non-transitory computer-readable medium storing instructions for controlling a computer system to provide a retargeting keyword and a retargeting search result, wherein the instructions control the computer system by a retargeting search service providing method including storing a log about query information input from a user during a preset period of time, and providing a retargeting keyword and a retargeting search result to at least one of a user mobile terminal and a user computer terminal according to an information providing point in time based on the stored log.

According to at least one example embodiment, there is provided a system for providing a retargeting search service, the system including a storage configured to store a log about query information input from a user during a preset period of time, and a provider configured to provide a retargeting keyword and a retargeting search result to at least one of a user mobile terminal and a user computer terminal according to an information providing point in time based on the stored log.

The storage may be further configured to generate a first log about query information input from the user mobile terminal and a second log about query information input from the user computer terminal, and to transmit the first log generated from the user mobile terminal to the user computer terminal and transmit the second log generated from the user computer terminal to the user mobile terminal.

The storage may be further configured to enable interaction between the user mobile terminal and the user computer terminal based on log-in information or unidentifiable personal information about the user that uses a search service.

The provider may be further configured to set a terminal to which the retargeting keyword and the retargeting search result are to be provided, based on the information providing point in time.

The provider may be further configured to provide a function of providing the retargeting keyword and the retargeting search result to the user mobile terminal after a first time preset as weekdays, based on information about a query input from the user computer terminal during the preset first time, or a function of providing the retargeting keyword and the retargeting search result to the user computer terminal after a second time preset as the weekdays based on information about a query input from the user mobile terminal during the preset second time.

The provider may be further configured to provide the retargeting keyword and the retargeting search result to the user mobile terminal during weekends, a day off, and a public holiday, based on query information input from the user computer terminal and the user mobile terminal during the weekdays.

The provider may be further configured to provide a different user interface of outputting the retargeting keyword and the retargeting search result to each of the user mobile terminal and the user computer terminal.

The provider may be further configured to output a search result page that includes the retargeting keyword and a search result about a query input from the user using the user mobile terminal, and to inform that the retargeting keyword is updated on the search result page.

The provider may be further configured to output an information providing page that includes the retargeting search result to be displayed on the search result page in a layer form, in response to a selection of the user on the retargeting keyword.

The provider may be further configured to provide a first frame for outputting a search result about a query input from the user using the user computer terminal and a second frame for outputting the retargeting keyword and the retargeting search result, and may be further configured to simultaneously output a result to be output on the first frame and a result to be output on the second frame.

The provider may be further configured to output at least one keyword retrieved by the user in response to the user unfolding a search box, and to mark the updated keyword in response to updating information about the output at least one keyword.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIGS. 6A and 6B illustrate examples of a retargeting search service providing system that marks an updated keyword in response to unfolding a search box according to one example embodiment.

Figure 1:
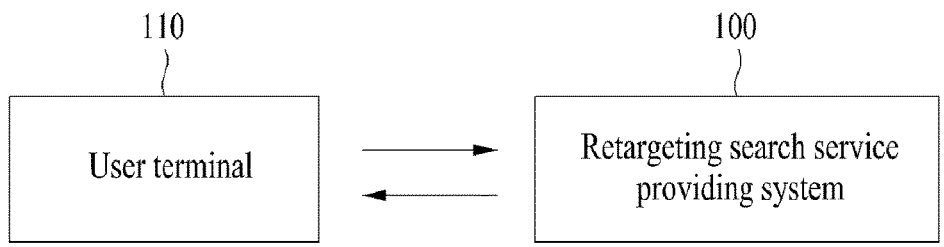
FIG. 1 is a block diagram illustrating an operation between a retargeting search service providing system and a user terminal according to one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to one or more example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, one or more example embodiments will be described with reference to the accompanying drawings.

FIG. 1 is a block diagram illustrating an operation between a retargeting search service providing system and a user terminal according to one example embodiment.

FIG. 1 illustrates a user terminal 110 and a retargeting search service providing system 100. In FIG. 1, indicators with arrowheads indicate that data may be transmitted and received between the retargeting search service providing system 100 and the user terminal 110 over a wired/wireless network.

The user terminal 110 may include a user mobile terminal and a user computer terminal. The user mobile terminal may include a portable device, for example, a mobile phone, a smartphone, etc., and the user computer terminal may include a small computer, for example, a laptop, a desktop, etc. Here, the user terminal 110 may refer to any type of terminals capable of connecting to a website/mobile site associated with the retargeting search service providing system 100 and/or installing and executing a service exclusive application (e.g., a computer program, a web applet, a smart device app, a widget, etc.). Here, the user terminal 110 may perform the overall service operation, such as service screen configuration, data input, data transmission and reception, data storage, or the like, under the control of the website/mobile site or the exclusive application.

The retargeting search service providing system 100 may be configured on a platform that provides a search service, and provides a retargeting keyword and a retargeting search result to the user terminal 110 through a search service. Here, the search service may indicate an Internet portal site, for example, Naver, Daum, Google, etc.

The retargeting search service providing system 100 may be configured to be included in a platform that provides a search service and, without being limited thereto, may be configured as a system different from the search service to manage a retargeting keyword and a retargeting search result through interaction with a search service server.

According to one or more example embodiments, the retargeting search service providing system 100 may provide new content based on a keyword previously used for search by a user, and may provide content and a keyword to be searched based on the previously used keyword and a result verified by the user.

Figure 2:
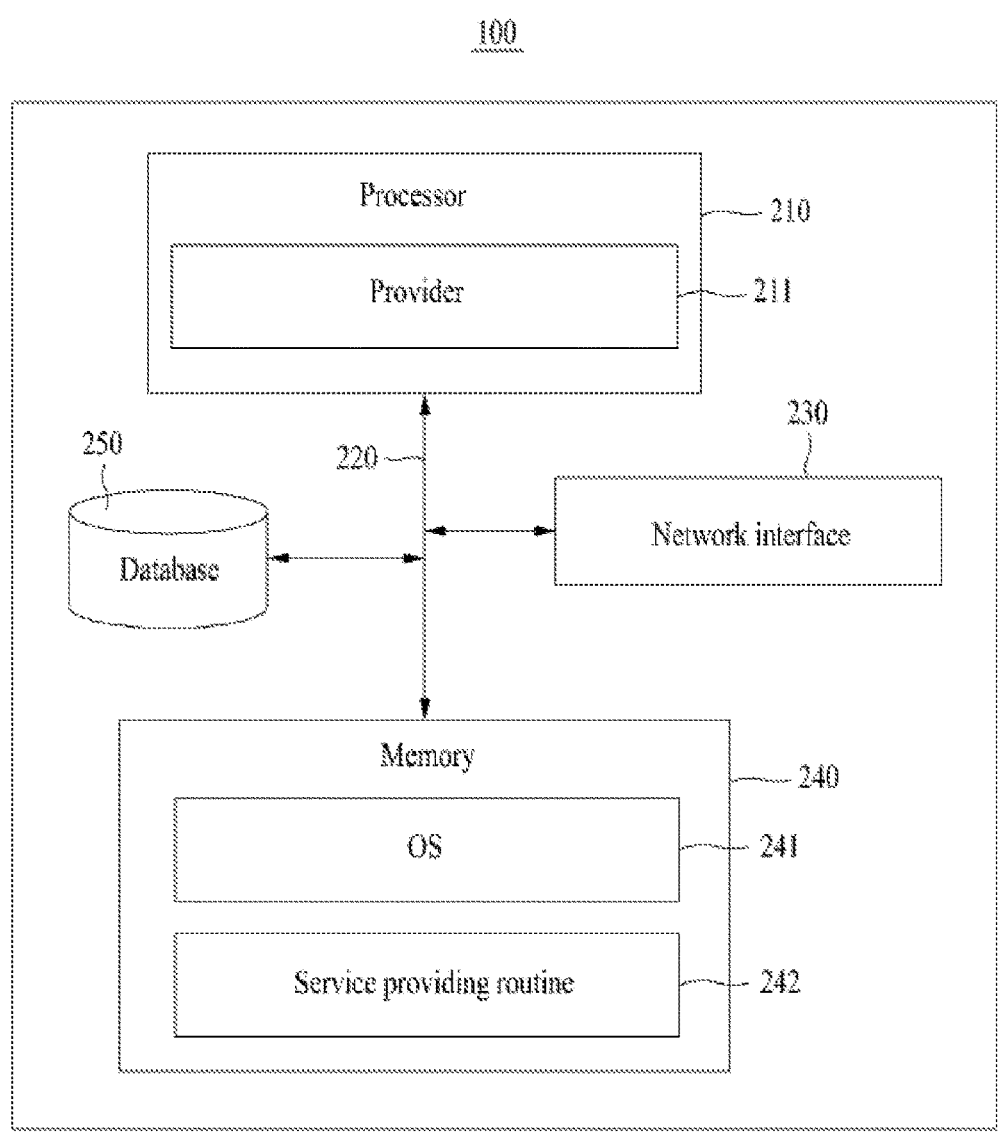
FIG. 2 is a block diagram illustrating a configuration of a retargeting search service providing system according to one example embodiment.

FIG. 2 is a block diagram illustrating a configuration of the retargeting search service providing system 100 according to one example embodiment.

Referring to FIG. 2, a retargeting search service providing system 100 includes one or more computing devices, such as a server, that include a processor 210, a bus 220, a network interface 230, a memory 240, and a database 250. The memory 240 includes an operating system (OS) 241 and a service providing routine 242. The processor 210 includes computer-readable instructions for specially programming the processor 210 as a provider 211. According to other example embodiments, the retargeting search service providing system 100 may include a greater or lesser number of constituent elements than the number of constituent elements shown in FIG. 2. However, there is no need to clearly illustrate many constituent elements according to the related art. For example, the retargeting search service providing system 100 may include other constituent elements such as a display, a transceiver, etc.

The memory 240 includes a permanent mass storage device, such as a random access memory (RAM), a read only memory (ROM), a disc drive, a solid state drive, an optical drive, etc., as a computer-readable storage medium. Also, program codes (e.g., computer readable instructions) for the OS 241, the service providing routine 242, the computer readable instructions associated with the provider 211, etc., may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, a memory card, etc. Software constituent elements may be loaded in the memory 240 through the network interface 230 instead of, or in addition to, the computer-readable storage medium.

The bus 220 enables communication and data transmission between the constituent elements of the retargeting search service providing system 100. The bus 220 may be configured using a high-speed serial bus, a parallel bus, a storage area network (SAN), and/or another appropriate communication technology.

The network interface 230 may be a computer hardware constituent element for connecting the retargeting search service providing system 100 to a computer network (not shown). The network interface 230 connects the retargeting search service providing system 100 to the computer network through a wireless and/or wired connection.

The database 250 may serve to store a log about query information input from a user. The database 250 may generate a log about query information input from the user mobile terminal 110 and may generate a log about query information input from a user computer terminal. Although FIG. 2 illustrates that the retargeting search service providing system 100 includes the database 250, it is only an example. The database 250 may be omitted based on a system configuration method or environment. Alternatively, the entire or a portion of a database 250 may be present as an external database constructed on a separate system.

The processor 210 may be configured to process computer-readable instructions of a computer program by performing a basic arithmetic operation, a logic operation, and an input/output operation of the retargeting search service providing system 100. The computer-readable instructions may be provided from the memory 240 and/or the network interface 230 to the processor 210 through the bus 220. The processor 210 is configured to execute program codes for the provider 211, etc. The program codes may be stored in a storage device such as the memory 240, for example, the service providing routine 242.

The provider 211 provides a retargeting keyword and a retargeting search result to at least one of a user mobile terminal and a user computer terminal according to an information providing point in time based on a stored log.

The provider 211 may set the user terminal 110 to which the retargeting keyword and the retargeting search result are to be provided, based on the information providing point in time. For example, the provider 211 may provide the retargeting keyword and the retargeting search result to a user mobile terminal after a first time preset as weekdays, based on information about a query input from a user computer terminal during the preset first time, or may provide the retargeting keyword and the retargeting search result to a user computer terminal after a second time preset as the weekdays based on information about a query input from a user mobile terminal during the preset second time. Also, the provider 211 may provide the retargeting keyword and the retargeting search result to a user mobile terminal during weekends, a day off, and a public holiday, based on query information input from a user computer terminal and the user mobile terminal during the weekdays.

The provider 211 may provide a different user interface of outputting the retargeting keyword and the retargeting search result to each of a user mobile terminal and a user computer terminal.

The provider 211 may output a search result page that includes the retargeting keyword and a search result about a query input from the user using a user mobile terminal, and may inform that the retargeting keyword is updated on the search result page. Here, in response to a selection of the user on the retargeting keyword, the provider 211 may output an information providing page that includes the retargeting search result to be displayed on the search result page in a layer form.

The provider 211 may provide a first frame for outputting a search result about a query input from the user using a user computer terminal and a second frame for outputting the retargeting keyword and the retargeting search result, and may simultaneously output a result to be output on the first frame and a result to be output on the second frame.

The provider 211 may output at least one keyword retrieved by the user in response to the user unfolding a search box, and may mark an updated keyword in response to updating information about the output at least one keyword.

Figure 3:
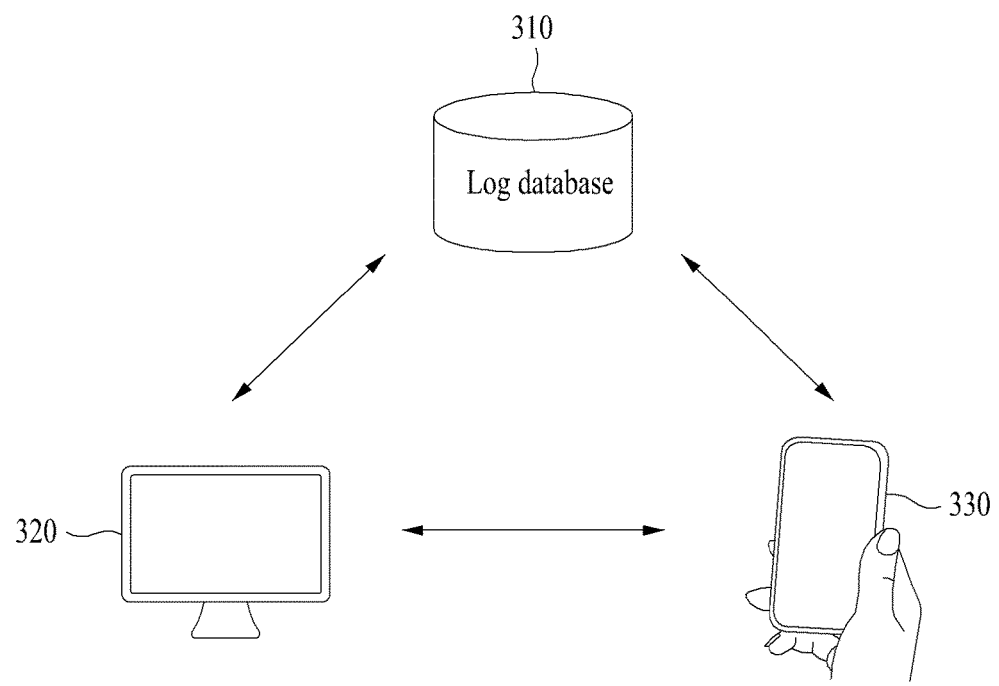
FIG. 3 is a diagram illustrating an operation of exchanging log information between a user mobile terminal and a user computer terminal at a retargeting search service providing system according to one example embodiment.

FIG. 3 is a diagram illustrating an operation of exchanging log information between a user mobile terminal and a user computer terminal at the retargeting search service providing system 100 according to an example embodiment.

The retargeting search service providing system 100 may store a log about query information input from a user mobile terminal 330 and a user computer terminal 320. For example, the retargeting search service providing system 100 may store, as a log, a keyword input from the user, information verified by the user, information retrieved by the user, etc.

The retargeting search service providing system 100 may store a log of the user mobile terminal 330 and a log of the user computer terminal 320 using a log database 310, and may enable data interaction between the user mobile terminal 330 and the user computer terminal 320. Here, the retargeting search service providing system 100 may enable information interaction between the user mobile terminal 330 and the user computer terminal 320 based on log-in information or unidentifiable personal information of a user that uses a search service.

The log database 310 may store a log about query information input from the user during a preset period of time. For example, the log database 310 may store a log about query information input from the user during one week. Here, the log database 310 may generate a first log about query information input from the user mobile terminal 330 and may generate a second log about query information input from the user computer terminal 320.

The log database 310 may transmit the first log generated from the user mobile terminal 330 to the user computer terminal 320 and may transmit the second log generated from the user computer terminal 320 to the user mobile terminal 330.

The log database 310 may analyze the stored log. For example, the log database 310 may store information about data retrieved from a user terminal 110 during the recent six months. Based on the stored information, the log database 310 may determine, for example, that the search time used at the user computer terminal 320 is greater than the search time used at the user mobile terminal 330 during the day time, that the search time used at the user mobile terminal 330 is greater than the search time used at the user computer terminal 320 during a time zone from evening to morning, that a search utilization is low during a time zone corresponding to dawn, and that the search time used at the user mobile terminal 330 is similar to the search time used at the user computer terminal 320 during lunch time.

Figure 4:
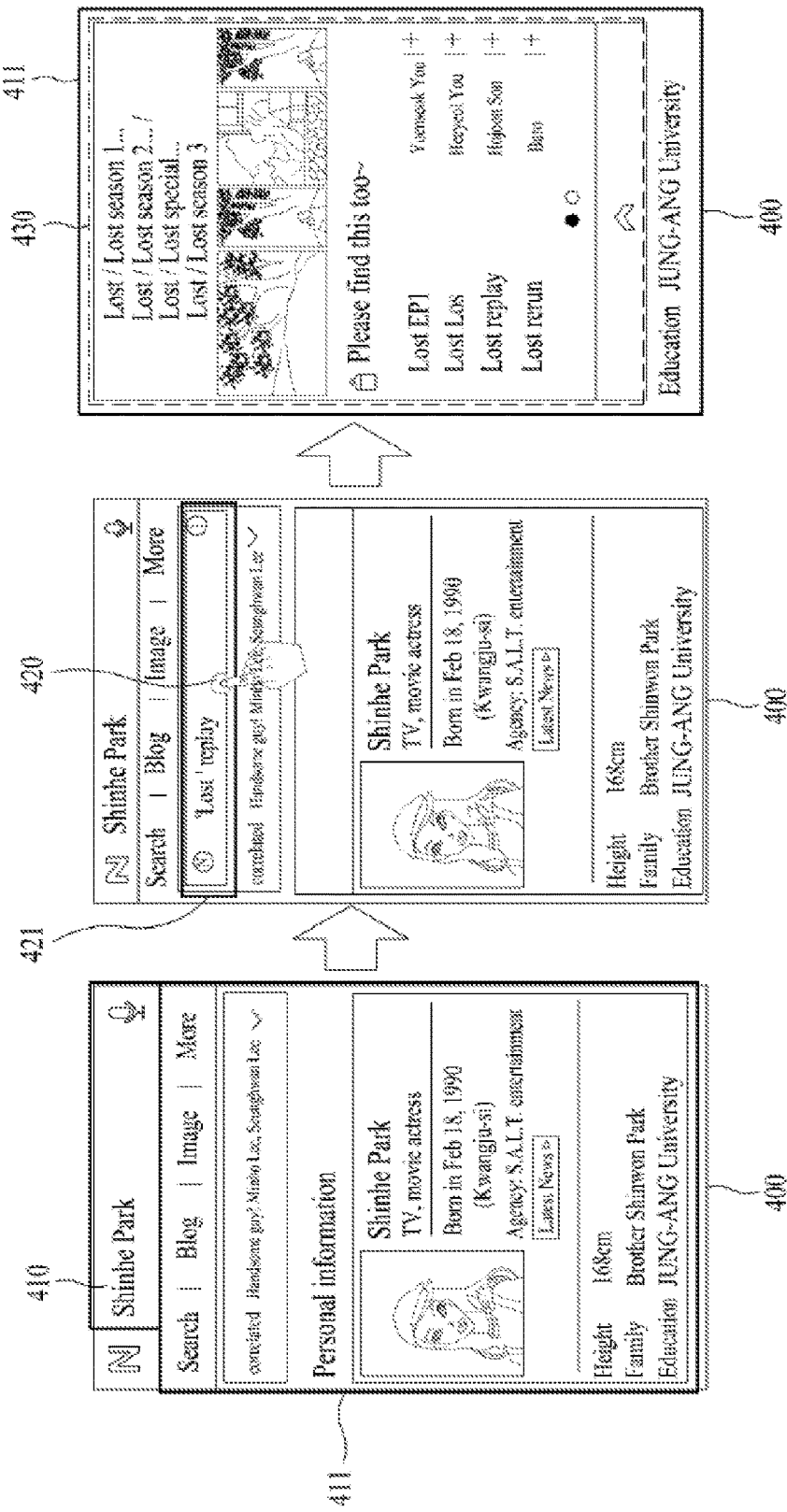
FIG. 4 illustrates an example of a retargeting search service providing system that provides a retargeting search service to a user mobile terminal according to one example embodiment.

FIG. 4 illustrates an example of the retargeting search service providing system 100 providing a retargeting search service to the user mobile terminal 330 according to an example embodiment.

The retargeting search service providing system 100 may provide a different user interface for outputting a retargeting keyword and a retargeting search result to each of the user mobile terminal 330 and the user computer terminal 320. A method of providing the retargeting keyword and the retargeting search result at the user mobile terminal 330 will be described with reference to FIG. 4.

The retargeting search service providing system 100 may output the retargeting keyword and the retargeting search result through a search service. The search service may be a portal site, for example, Naver, Daum, etc. Here, a user may use the search service by installing a search service application in the user mobile terminal 330 and may connect to the search service using a web browser such as Explorer of the mobile terminal, etc.

The retargeting search service providing system 100 may output a search result page 411 that includes a retargeting keyword and a search result about a query 410 input from the user using a display screen 400 of the user mobile terminal 330, and may inform that a retargeting keyword 421 is updated on the search result page 411.

For example, the user using the user mobile terminal 330 may enter "Shinhe Park" in a search box of the search service as the query 410. In response thereto, the retargeting search service providing system 100 may output a search result about "Shinhe Park" on the search result page 411. For example, personal information about "Shinhe Park" may be output from the search service.

The retargeting search service providing system 100 may output the retargeting keyword 421 on the search result page 411. Here, the retargeting search service providing system 100 may inform that the retargeting keyword 421 is updated on the search result page 411. For example, updating "Lost replay" may be displayed on the search result page 411. The terms "output" and "display" may be interchangeably used throughout herein.

The retargeting search service providing system 100 may simultaneously output a search result about the query 410 input from the user and the retargeting keyword 421 on the search result page 411. For example, the retargeting search service providing system 100 may output the retargeting keyword 421 on an upper end of the display screen 400 on which the search result about "Shinhe Park" is displayed (the middle display screen 400 in FIG. 4). Further, the retargeting search service providing system 100 may output at least one of keywords previously used for search by the user as a representative retargeting keyword.

The user may select the retargeting keyword 421 displayed on the search result page 411 of the search service using a finger 420. For example, when the displayed retargeting keyword 421 is "lost replay", the user may select "lost replay". In this example, the retargeting search service providing system 100 may output a result about "lost" that is a retargeting search result on an information providing page 431 (the rightmost display screen 400 in FIG. 4). Here, the retargeting search service providing system 100 may output the information providing page 430 about "lost" selected by the user to be displayed on the search result page 411 on which the search result about "Shinhe Park" is output, in a layer form.

In response to the user selecting at least one of the search results about "lost" displayed on the information providing page 430, detailed content about the selected search result may be output and the user may move to a page corresponding to the selected search result.

Figure 5:
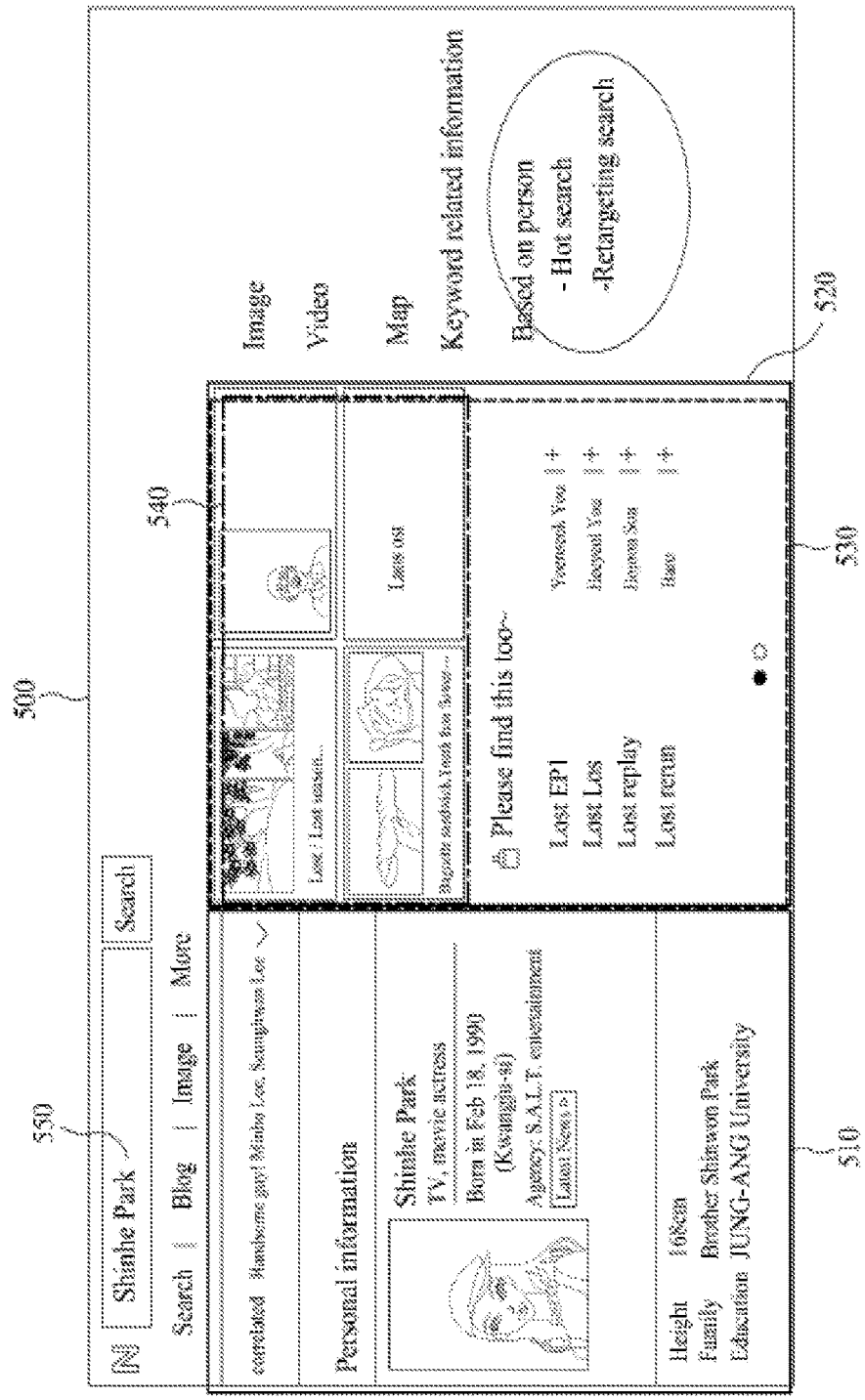
FIG. 5 illustrates an example of a retargeting search service providing system that provides a retargeting search service to a user computer terminal according to one example embodiment.

FIG. 5 illustrates an example of the retargeting search service providing system 100 providing a retargeting search service to the user computer terminal 320 according to another example embodiment.

The retargeting search service providing system 100 may provide a different user interface of outputting a retargeting keyword and a retargeting search result to each of the user mobile terminal 330 and the user computer terminal 320. A method of providing the retargeting keyword and the retargeting search result at the user computer terminal 320 will be described with reference to FIG. 5.

The retargeting search service providing system 100 may output the retargeting keyword and the retargeting search result through a search service. Here, the search service may be an Internet portal site, for example, Naver, Daum, etc. A user using the user computer terminal 320 may connect to the search service through a web browser such as Explorer, etc.

The retargeting search service providing system 100 may provide a first frame 510 for outputting a search result about a query 550 input from the user using the user computer terminal 320 and a second frame 520 for outputting the retargeting keyword and the retargeting search result on the display screen 500 of the user computer terminal 320, and may simultaneously output the result to be output on the first frame 510 and the result to be output on the second frame 520.

For example, the user using the user computer terminal 320 may enter "Shinhe Park" in a search box of the search service as a query 550. The retargeting search service providing system 100 may output a search result about "Shinhe Park" on the first frame 510 through the search service. In this example, information about personal information of "Shinhe Park" may be displayed on the first frame 510.

Further, the retargeting search result may be displayed on the second frame 520 in response to the user selecting a retargeting keyword. For example, when a retargeting keyword is "lost", the user may select "lost".

In this example, a result about "lost" may be output on the second frame 520. The retargeting search result may be output in a content type 540 and/or a search type 530.

For example, in the content type 540, content about the retargeting search result may be simply displayed together with an image file. In the search type 530, content about the retargeting search result may be displayed in a list form. In response to the user selecting at least one of the content displayed in the content type 540 and/or the content displayed in the search type 530, the selected content may be displayed to be in further detail, and the user may move to a page corresponding to the selected search result.

Figure 6A:
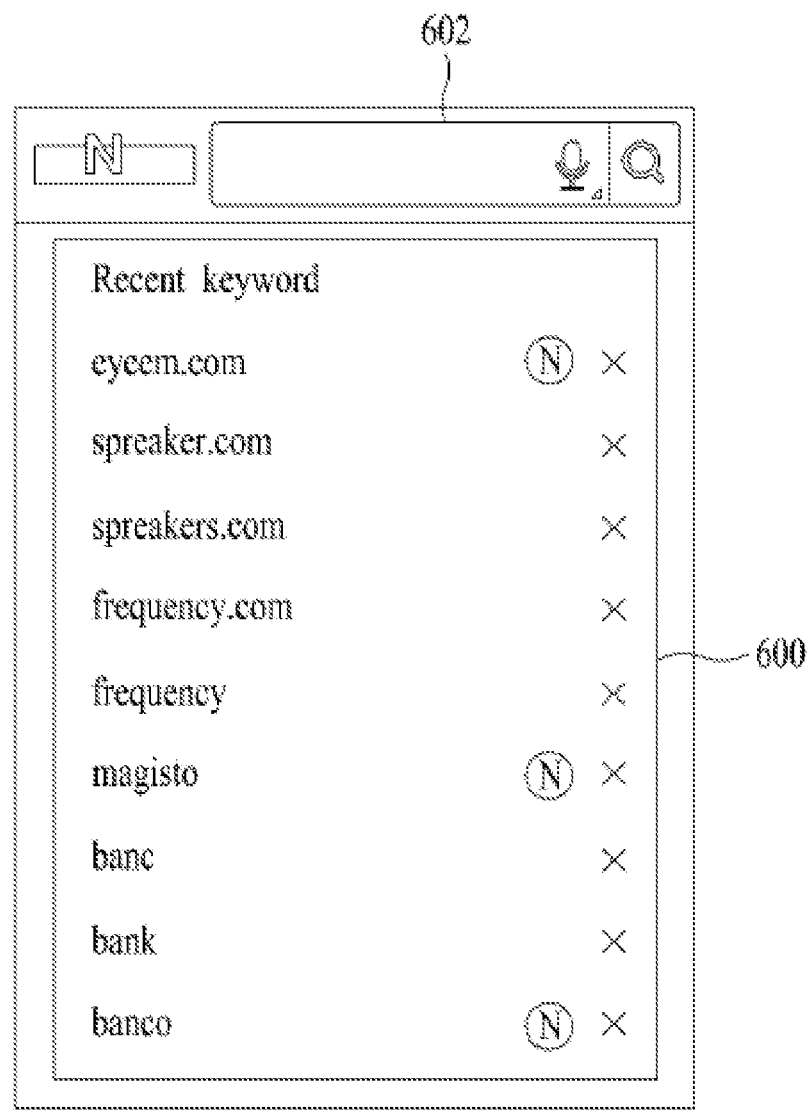
Figure 6B:
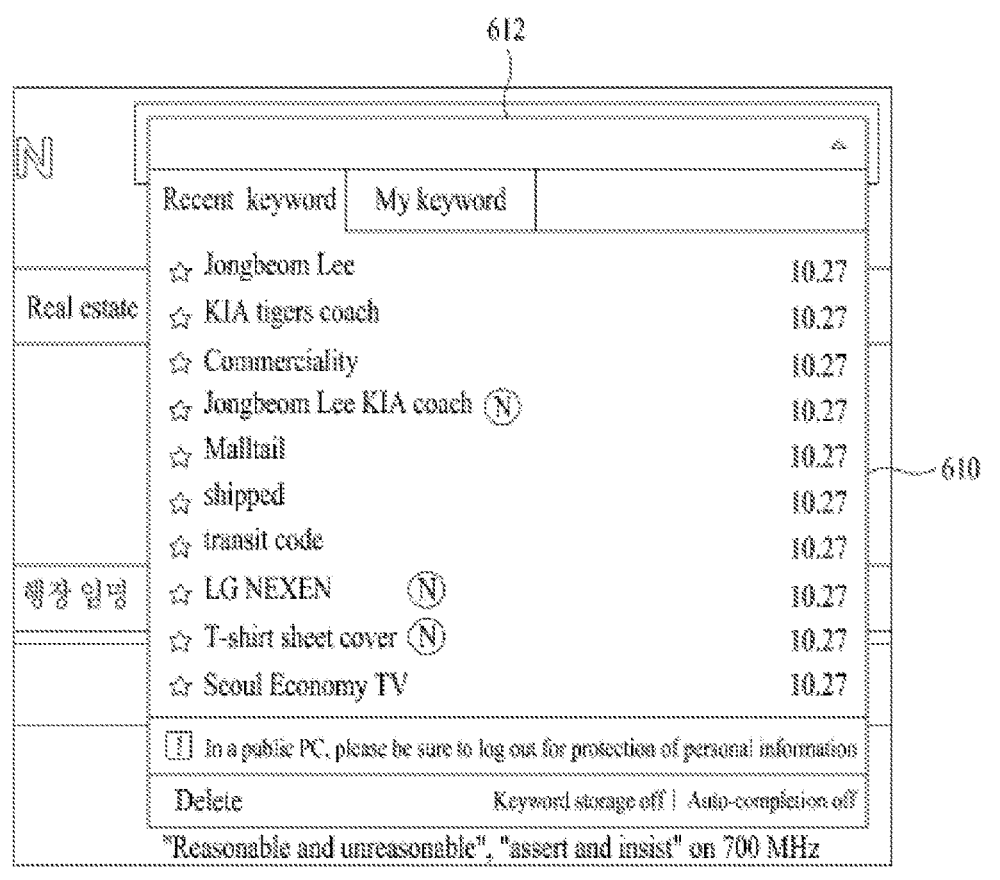

FIGS. 6A and 6B illustrate examples of the retargeting search service providing system 100 marking an updated keyword in response to unfolding a search box according to one or more example embodiments.

FIG. 6A illustrates an example of recent keywords output in a keyword box 600 of a search service provided at the user mobile terminal 330, and FIG. 6B illustrates an example of recent keywords output in a keyword box 610 of a search service provided at the user computer terminal 320. Here, in response the user unfolding a search box, the retargeting search service providing system 100 may display keywords that are updated to a recent keyword list, which may be applicable to both of the user mobile terminal 330 and the user computer terminal 320.

Referring to FIG. 6A, in an example in which a user using the user mobile terminal 330 has searched for at least one of "eyeem.com," "speaker.com," "magisto," etc., through the search service, keywords previously used for search by the user may be displayed in the keyword box 600 in response to the user unfolding the search box 602. Here, the previously used keywords may be displayed in a list form and updated keywords among the previously used keywords may be marked. For example, the retargeting search service providing system 100 may inform the user that information about "eyeem.com," "magisto," etc. has been updated by placing a mark (e.g., letter "N" in a circle in FIG. 6A) by the updated keywords.

Similarly, referring to FIG. 6B, in an example in which a user using the user computer terminal 320 has searched for at least one of "Jongbeom Lee KIA coach," "LG NEXEN," "Jongbeom Lee," etc., the user may unfold the search box 612, and in response thereto, the retargeting search service providing system 100 may display keywords previously used for search by the user in the keyword box 610. Here, the previously used keywords may be displayed in a list form and an updated keyword among the previously used keywords may be marked. For example, the retargeting search service providing system 100 may inform the user that information about "Jongbeon Lee KIA coach," "LG NEXEN," etc., has been updated by placing a mark (e.g., letter "N" in a circle in FIG. 6A) by the updated keywords.

Figure 7:
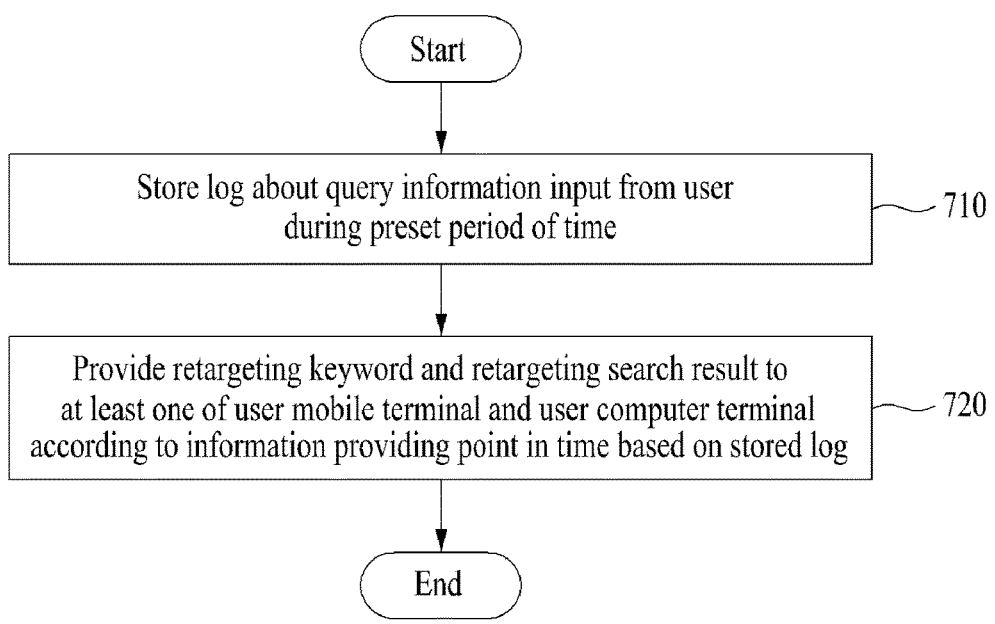
FIG. 7 is a flowchart illustrating a retargeting search service providing method performed by a retargeting search service providing system according to one example embodiment.

FIG. 7 is a flowchart illustrating a retargeting search service providing method performed by the retargeting search service providing system 100 according to an example embodiment. The description relating to the retargeting search service providing system may refer to the description made above with reference to FIGS. 1 through 6.

In operation 710, the retargeting search service providing system 100 stores a log about query information input from a user during a preset period of time. The retargeting search service providing system 100 generates a first log about query information input from a user mobile terminal 330 and a second log about query information input from a user computer terminal 320. The retargeting search service providing system 100 transmits the first log generated from the user mobile terminal 330 to the user computer terminal 320 and transmits the second log generated from the user computer terminal to the user mobile terminal. Here, the retargeting search service providing system 100 enables interaction between the user mobile terminal 330 and the user computer terminal 320 based on log-in information or unidentifiable personal information about a user that uses a search service.

In operation 720, the retargeting search service providing system 100 provides a retargeting keyword and a retargeting search result to at least one of the user mobile terminal 330 and the user computer terminal 320 according to an information providing point in time based on the stored log. The retargeting search service providing system 100 determines a terminal to which the retargeting keyword and the retargeting search result are to be provided, based on the information providing point in time. For example, the retargeting search service providing system 100 may provide retargeting keywords to the user mobile terminal 330 in the evening based on data retrieved at the user computer terminal 320 during a time zone from morning to afternoon, and may provide retargeting keywords to the user computer terminal in the morning/afternoon time zones based on data retrieved at the user mobile terminal during a time zone corresponding to evening/night/morning. Further, the retargeting search service providing system 100 may provide retargeting keywords to the user mobile terminal 330 during weekends, a day off, and a public holiday, based on data retrieved at the user mobile terminal and the user computer terminal during weekdays. Also, the retargeting search service providing system 100 may provide retargeting keywords to the user mobile terminal 330 or the user computer terminal 320 in the dawn based on data retrieved at the user mobile terminal and the user computer terminal during a day.

The retargeting search service providing system 100 may provide a different user interface of outputting a retargeting keyword and a retargeting search result to each of the user mobile terminal 330 and the user computer terminal 320. For example, the retargeting search service providing system 100 may output a search result page that includes the retargeting keyword and a search result about a query input from the user using the user mobile terminal 330, and may inform that the retargeting keyword is updated on the search result page of the computer terminal or the mobile terminal. In this example, the retargeting search service providing system 100 may output an information providing page that includes the retargeting search result to be displayed on the search result page in a layer form, in response to a selection of the user on the retargeting keyword. Further, the retargeting search service providing system 100 may output a first frame for outputting a search result about a query input from the user using the user computer terminal 320 and a second frame for outputting the retargeting keyword and the retargeting search result, and may simultaneously output a result to be output on the first frame and a result to be output on the second frame.

The retargeting search service providing system 100 may output at least one keyword retrieved by the user in response to the user unfolding a search box, and may mark an updated keyword in response to updating information about the output at least one keyword.

According to one or more example embodiments, the retargeting search service providing system 100 may analyze the utilization time of a user mobile terminal 330 and a user computer terminal 320 and may provide retargeting keywords to the user mobile terminal or the user computer terminal according to a preset time based on a stored log.

Also, according to one or more example embodiments, the retargeting search service providing system 100 enables interaction between data retrieved from a user mobile terminal 330 and data retrieved from a user computer terminal 320 based on log-in information and unidentifiable personal information.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing a retargeting search service, the method comprising:
storing, by a processor, a log about query information input from a user from a user mobile terminal and a user computer terminal during a preset period of time, in a database, wherein the user mobile terminal is a portable device comprising a mobile phone or a smartphone, and the user computer terminal comprises a laptop computer or a desktop computer;
analyzing the stored log for information about data retrieved from the user mobile terminal and the user computer terminal during the preset period of time, wherein said analyzing includes analyzing the information about data retrieved from the user mobile terminal and the user computer terminal to compare a first amount of search utilization time at the user mobile terminal during at least one time zone within the preset period of time with a second amount of search utilization time at the user computer terminal during the at least one time zone within the preset period of time;
providing, by the processor, a retargeting keyword and a retargeting search result to one of the user mobile terminal or the user computer terminal, but not both, at an information providing point in time based on said analyzing;
wherein the providing of the retargeting keyword and the retargeting search result comprises determining whether the retargeting keyword and the retargeting search result is to be provided to the user mobile terminal or, alternatively, to the user computer terminal, based on said analyzing and the information providing point in time;
wherein the providing of the retargeting keyword and the retargeting search result further comprises providing a first user interface outputting the retargeting keyword and the retargeting search result to the user mobile terminal when it is determined that the user mobile terminal is to be provided the retargeting keyword and the retargeting search result,
wherein the providing of the retargeting keyword and the retargeting search result further comprises providing a second user interface outputting the retargeting keyword and the retargeting search result to the user computer terminal when it is determined that the user computer terminal is to be provided the retargeting keyword and the retargeting search result;
wherein first user interface is a different user interface than the second user interface; and
wherein the providing of the retargeting keyword and the retargeting search result further comprises providing a first frame for outputting a search result about a query input from the user using the user computer terminal and a second frame for outputting the retargeting keyword and the retargeting search result, and simultaneously outputting a result to be output on the first frame and a result to be output on the second frame.

2. The method of claim 1, wherein the storing of the log comprises:
generating a first log about query information input from the user mobile terminal and a second log about query information input from the user computer terminal; and
transmitting the first log generated from the user mobile terminal to the user computer terminal, and transmitting the second log generated from the user computer terminal to the user mobile terminal.

3. The method of claim 2, wherein the storing of the log comprises enabling interaction between the user mobile terminal and the user computer terminal based on log-in information or unidentifiable personal information about the user that uses a search service.

4. The method of claim 1, wherein the providing of the retargeting keyword and the retargeting search result comprises providing the retargeting keyword and the retargeting search result to the user mobile terminal after a first time preset as weekdays, based on information about a query input from the user computer terminal during the preset first time, or to the user computer terminal after a second time preset as the weekdays based on information about a query input from the user mobile terminal during the preset second time.

5. The method of claim 4, wherein the providing of the retargeting keyword and the retargeting search result comprises providing the retargeting keyword and the retargeting search result to the user mobile terminal during weekends, a day off, and a public holiday, based on query information input from the user computer terminal and the user mobile terminal during the weekdays.

6. The method of claim 1, wherein the providing of the retargeting keyword and the retargeting search result comprises outputting a search result page that includes the retargeting keyword and a search result about a query input from the user using the user mobile terminal, and informing that the retargeting keyword is updated on the search result page.

7. The method of claim 6, wherein the providing of the retargeting keyword and the retargeting search result comprises outputting an information providing page that includes the retargeting search result to be displayed on the search result page in a layer form, in response to a selection of the user on the retargeting keyword.

8. The method of claim 1, wherein the providing of the retargeting keyword and the retargeting search result comprises outputting at least one keyword retrieved by the user in response to the user unfolding a search box, and marking an updated keyword in response to updating information about the output at least one keyword.

9. A non-transitory computer-readable medium storing instructions for controlling a computer system to provide a retargeting keyword and a retargeting search result through a retargeting search service, wherein the instructions control the computer system to perform the steps comprising:
storing a log about query information input from a user from a user mobile terminal and a user computer terminal during a preset period of time, wherein the user mobile terminal is a portable device comprising a mobile phone or a smartphone, and the user computer terminal comprises a laptop computer or a desktop computer;
analyzing the stored log for information about data retrieved from the user mobile terminal and the user computer terminal during the preset period of time, wherein said analyzing includes analyzing the information about data retrieved from the user mobile terminal and the user computer terminal to compare a first amount of search utilization time at the user mobile terminal during at least one time zone within the preset period of time with a second amount of search utilization time at the user computer terminal during the at least one time zone within the preset period of time;

providing a retargeting keyword and a retargeting search result to one of the user mobile terminal or the user computer terminal, but not both, at an information providing point in time based on said analyzing;

wherein providing the retargeting keyword and the retargeting search result comprises determining whether the retargeting keyword and the retargeting search result is to be provided to the user mobile terminal or, alternatively, to the user computer terminal, based on said analyzing and the information providing point in time;

wherein the provider is further configured to provide a first user interface outputting the retargeting keyword and the retargeting search result to the user mobile terminal when it is determined that the user mobile terminal is to be provided the retargeting keyword and the retargeting search result, wherein the provider is further configured to provide a second user interface outputting the retargeting keyword and the retargeting search result to the user computer terminal when it is determined that the user computer terminal is to be provided the retargeting keyword and the retargeting search result;

wherein the first user interface is a different user interface than the second user interface; and wherein the provider is further configured to provide a first frame for outputting a search result about a query input from the user using the user computer terminal and a second frame for outputting the retargeting keyword and the retargeting search result, and is further configured to simultaneously output a result to be output on the first frame and a result to be output on the second frame.

10. A system for providing a retargeting search service, the system comprising:
a storage configured to store a log about query information input from a user from a user mobile terminal and a user computer terminal during a preset period of time, wherein the user mobile terminal is a portable device comprising a mobile phone or a smartphone, and the user computer terminal comprises a laptop computer or a desktop computer;
an analyzer configured to analyze the stored log for information about data retrieved from the user mobile terminal and the user computer terminal during the preset period of time, wherein said analyzing includes analyzing the information about data retrieved from the user mobile terminal and the user computer terminal to compare a first amount of search utilization time at the user mobile terminal during at least one time zone within the preset period of time with a second amount of search utilization time at the user computer terminal during the at least one time zone within the preset period of time; and
a provider configured to provide a retargeting keyword and a retargeting search one of the user mobile terminal or the user computer terminal, but not both, at an information providing point in time based on said analyzing;
wherein providing the retargeting keyword and the retargeting search result comprises determining whether the retargeting keyword and the retargeting search result is to be provided to the user mobile terminal or, alternatively, to the user computer terminal, based on said analyzing and the information providing point in time;
wherein the provider is further configured to provide a first user interface outputting the retargeting keyword and the retargeting search result to the user mobile terminal when it is determined that the user mobile terminal is to be provided the retargeting keyword and the retargeting search result, wherein the provider is further configured to provide a second user interface outputting the retargeting keyword and the retargeting search result to the user computer terminal when it is determined that the user computer terminal is to be provided the retargeting keyword and the retargeting search result;

wherein the first user interface is a different user interface than the second user interface; and wherein the provider is further configured to provide a first frame for outputting a search result about a query input from the user using the user computer terminal and a second frame for outputting the retargeting keyword and the retargeting search result, and is further configured to simultaneously output a result to be output on the first frame and a result to be output on the second frame.

11. The system of claim 10, wherein the storage is further configured to generate a first log about query information input from the user mobile terminal and a second log about query information input from the user computer terminal, and to transmit the first log generated from the user mobile terminal to the user computer terminal and transmit the second log generated from the user computer terminal to the user mobile terminal.

12. The system of claim 11, wherein the storage is further configured to enable interaction between the user mobile terminal and the user computer terminal based on log-in information or unidentifiable personal information about the user that uses a search service.

13. The system of claim 10, wherein the provider is further configured to provide the retargeting keyword and the retargeting search result to the user mobile terminal after a first time preset as weekdays, based on information about a query input from the user computer terminal during the preset first time, or to the user computer terminal after a second time preset as the weekdays based on information about a query input from the user mobile terminal during the preset second time.

14. The system of claim 13, wherein the provider is further configured to provide the retargeting keyword and the retargeting search result to the user mobile terminal during weekends, a day off, and a public holiday, based on query information input from the user computer terminal and the user mobile terminal during the weekdays.

15. The system of claim 10, wherein the provider is further configured to output a search result page that includes the retargeting keyword and a search result about a query input from the user using the user mobile terminal, and to inform that the retargeting keyword is updated on the search result page.

16. The system of claim 15, wherein the provider is further configured to output an information providing page that includes the retargeting search result to be displayed on the search result page in a layer form, in response to a selection of the user on the retargeting keyword.

17. The system of claim 10, wherein the provider is further configured to output at least one keyword retrieved by the user in response to the user unfolding a search box, and to mark an updated keyword in response to updating information about the output at least one keyword.

* * * * *